(12) United States Patent
Yoshida

(10) Patent No.: US 12,337,739 B2
(45) Date of Patent: Jun. 24, 2025

(54) COMPOSITE MEMBER, SEAT FOR AUTOMOBILE, AND COMPONENT FOR AUTOMOBILE

(71) Applicant: TOYOTA BOSHOKU KABUSHIKI KAISHA, Aichi (JP)

(72) Inventor: Kento Yoshida, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 613 days.

(21) Appl. No.: 17/702,103

(22) Filed: Mar. 23, 2022

(65) Prior Publication Data

US 2022/0305972 A1    Sep. 29, 2022

(30) Foreign Application Priority Data

Mar. 25, 2021   (JP) ................................ 2021-052405

(51) Int. Cl.
*B60N 2/68* (2006.01)
*B29C 65/00* (2006.01)
*B29L 31/00* (2006.01)

(52) U.S. Cl.
CPC ............ *B60N 2/682* (2013.01); *B29C 66/723* (2013.01); *B29C 66/742* (2013.01); *B29L 2031/771* (2013.01)

(58) Field of Classification Search
None
See application file for complete search history.

(56) References Cited

U.S. PATENT DOCUMENTS

| | | |
|---|---|---|
| 8,795,804 B2 | 8/2014 | Hamada et al. |
| 9,279,436 B2 | 3/2016 | Osada et al. |
| 10,087,966 B2 | 10/2018 | Iwano |
| 10,266,086 B2 | 4/2019 | Furuta |
| 10,654,221 B2 | 5/2020 | Yasuyama et al. |
| 11,623,432 B2 | 4/2023 | Ibaragi et al. |
| 2009/0117366 A1 | 5/2009 | Honma |
| 2012/0219763 A1 | 8/2012 | Hamada et al. |

(Continued)

FOREIGN PATENT DOCUMENTS

| | | |
|---|---|---|
| CN | 101010188 | 8/2007 |
| CN | 105382986 | 3/2016 |

(Continued)

OTHER PUBLICATIONS

Office Action issued in China Patent Application No. 202210271642.X, dated Sep. 15, 2023, along with an English translation thereof.

(Continued)

*Primary Examiner* — Xiaobei Wang
(74) *Attorney, Agent, or Firm* — Greenblum & Bernstein, P.L.C.

(57) ABSTRACT

Provided are a composite member, a seat for automobile, and a component for automobile that suppress a decrease in strength at a connection place between a metal member and a fiber-reinforced member. A composite member includes: a fiber-reinforced member formed by impregnating a plurality of sheet-shaped core materials with a matrix resin; and a metal member joined to the fiber-reinforced member. The composite member has a structure in which a part of the metal member is sandwiched and fixed between a plurality of the core materials stacked in a thickness direction at a joint place between the fiber-reinforced member and the metal member.

8 Claims, 6 Drawing Sheets

(56) References Cited

U.S. PATENT DOCUMENTS

| | | | |
|---|---|---|---|
| 2013/0322962 A1* | 12/2013 | Osada | B29C 65/56 |
| | | | 403/361 |
| 2016/0053788 A1 | 2/2016 | Iwano | |
| 2016/0288683 A1 | 10/2016 | Furuta | |
| 2018/0086005 A1 | 3/2018 | Yasuyama et al. | |
| 2018/0090242 A1 | 3/2018 | Hongo et al. | |
| 2018/0126605 A1* | 5/2018 | Suzuki | B32B 5/28 |
| 2020/0316915 A1* | 10/2020 | Ibaragi | B29C 65/485 |
| 2021/0187908 A1 | 6/2021 | Ibaragi et al. | |
| 2022/0177657 A1* | 6/2022 | Koori | B32B 5/024 |

FOREIGN PATENT DOCUMENTS

| | | |
|---|---|---|
| CN | 105793107 | 7/2016 |
| CN | 210126464 | 3/2020 |
| CN | 111526984 | 8/2020 |
| JP | 2012-176514 | 9/2012 |
| JP | 2016-16592 | 2/2016 |
| JP | 2017-65218 | 4/2017 |
| JP | 2017-121838 | 7/2017 |
| JP | 2019-64133 | 4/2019 |
| WO | 2016/159010 | 12/2017 |

OTHER PUBLICATIONS

Office Action issued in China Patent Appl. No. 202210271642.X, dated Mar. 30, 2023, along with an English translation thereof.
Office Action issued in Japan Patent Appl. No. 2021-52405, dated Mar. 26, 2024, along with an English translation thereof.

* cited by examiner

COMPOSITE MEMBER, SEAT FOR AUTOMOBILE, AND COMPONENT FOR AUTOMOBILE

BACKGROUND OF THE INVENTION

(1) Field of the Invention

The present invention relates to a composite member including a fiber-reinforced member formed by impregnating a plurality of sheet-shaped core materials with a matrix resin and a metal member joined to the fiber-reinforced member, and a seat for automobile and a component for automobile each including a site formed of the composite member.

(2) Description of Related Art

A fiber-reinforced member formed by impregnating a core material made of fibers or the like with a matrix resin is lightweight and has high strength, and thus is used in various fields such as the automobile industry. Further, recently, in order to achieve high function, hybrid function, high added value, and the like, a composite member formed by joining the fiber-reinforced member to a metal member that is a dissimilar material is desired.

Usually, the metal member and the fiber-reinforced member are joined, for example, by fastening using a fastening member such as a bolt, a nut, caulking, or a rivet, welding using a high energy beam, friction, ultrasonic waves, or the like, or adhesion using an adhesive or the like.

For example, JP 2017-121838 A describes a composite member in which a fiber-reinforced member and a metal member are superposed, a through hole is formed at the superposed place, a fastening member (as a specific example, a bolt) is inserted into the through hole, and the fiber-reinforced member and the metal member are joined by fastening.

WO 2016/159010 describes a method in which a resin member and glass through which a laser beam is transmitted are superposed on a metal member in this order, and the superposed place is irradiated with the laser beam from the resin member side through the glass to join the fiber-reinforced member and the metal member by laser welding.

SUMMARY OF THE INVENTION

As described in JP 2017-121838 A and WO 2016/159010, usually, a metal member and a fiber-reinforced member of a composite member are joined by superposing a part of the fiber-reinforced member and a part of the metal member in a thickness direction, and fastening, welding, adhering, and the like the superposed place. In such a composite member, when a joint place between the metal member and the fiber-reinforced member is viewed in cross section, the fiber-reinforced member and the metal member are joined in a parallel state in which central axes thereof are misaligned, that is, in a so-called offset state.

When a load is applied, a peeling mode in which stress for peeling the metal member and the fiber-reinforced member from each other is applied occurs at the joint place where they are joined in the offset state, so that the strength tends to decrease. In particular, fastening using a fastening member such as a bolt or a nut may cause stress concentration by the fastening member, leading to a decrease in strength and also destruction of the joint place.

The present invention has been made in view of the above circumstances, and an object of the present invention is to provide a composite member, a seat for automobile, and a component for automobile capable of suppressing a decrease in strength at a connection place between a metal member and a fiber-reinforced member.

To solve the above problems, the present invention is presented as follows.

An invention of a composite member according to 1 relates to a composite member including: a fiber-reinforced member formed by impregnating a plurality of sheet-shaped core materials with a matrix resin; and a metal member joined to the fiber-reinforced member, the composite member having a structure in which a part of the metal member is sandwiched and fixed between a plurality of the core materials stacked in a thickness direction at a joint place between the fiber-reinforced member and the metal member.

An invention of a composite member according to 2 relates to the composite member according to 1, wherein the core materials each include a base layer and a fiber layer formed by arranging fiber bundles on one surface side of the base layer, and wherein the core material at the joint place is disposed such that the base layer is in contact with the metal member.

An invention of a composite member according to 3 relates to the composite member according to 2, wherein the core material constituting the fiber-reinforced member has a plurality of the fiber layers, and wherein the core material at the joint place has a smaller number of the fiber layers than a number of the fiber layers of the core material constituting the fiber-reinforced member.

An invention of a composite member according to 4 relates to the composite member according to 1, wherein, at the joint place, the metal member has an anchor portion locked to the core material.

An invention of a composite member according to 5 relates to the composite member according to 4, wherein the anchor portion is formed by bending an end of the metal member.

An invention of a composite member according to 6 relates to the composite member according to 4, wherein the anchor portion is formed by cutting out a peripheral edge of the metal member.

An invention of a seat for automobile according to 7 relates to a seat for automobile including a site formed of the composite member according to any one of 1 to 6.

An invention of a component for automobile according to 8 relates to a component for automobile including a site formed of the composite member according to any one of 1 to 6.

According to the present invention, it is possible to provide a composite member, a seat for automobile, and a component for automobile, capable of suppressing a decrease in strength at the joint place between the metal member and the fiber-reinforced member due to the structure in which a part of the metal member is sandwiched and fixed between a plurality of the core materials stacked in the thickness direction at the joint place between the fiber-reinforced member and the metal member.

BRIEF DESCRIPTION OF THE DRAWINGS

The present invention will be further described in the following detailed description with reference to the following figures, given non-limiting examples of exemplary embodiments according to the invention, and like reference symbols represent identical parts through several figures.

DETAILED DESCRIPTION OF PREFERRED EMBODIMENTS

The particulars described herein are given by way of example and for the purpose of illustrative discussion of the embodiments of the present invention, and are presented for the purpose of providing what is believed to be the description from which the principles and conceptual features of the present invention can be most effectively and readily understood. In this regard, it is not intended to show structural details of the present invention in more detail than is necessary for the fundamental understanding of the present invention, and the description is taken with the drawings making apparent to those skilled in the art how several forms of the present invention may be embodied in practice.

Figure 1:
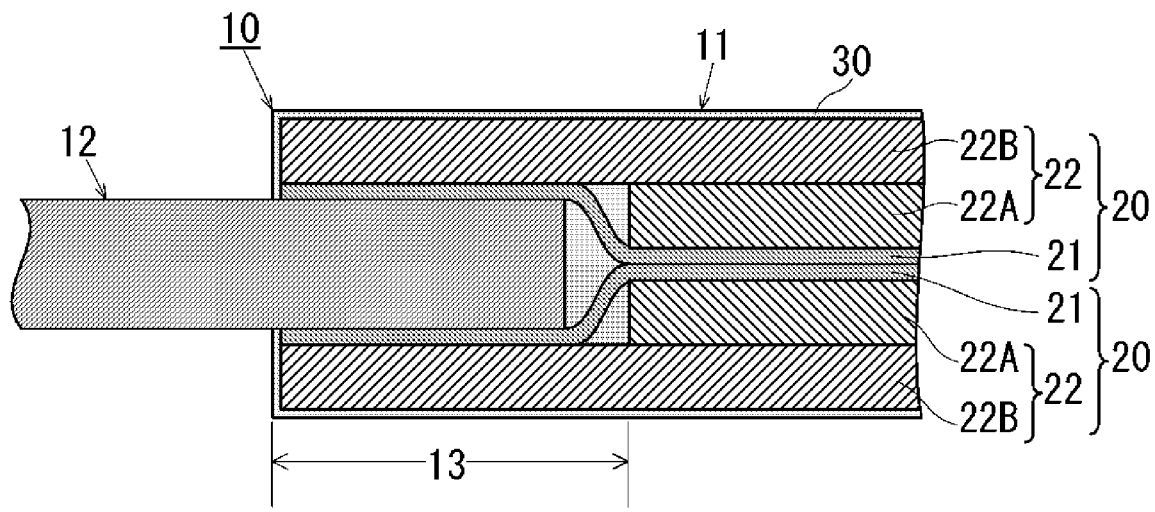
FIG. 1 is a cross-sectional view for explaining an example of a composite member of the present invention.
Figure 2:
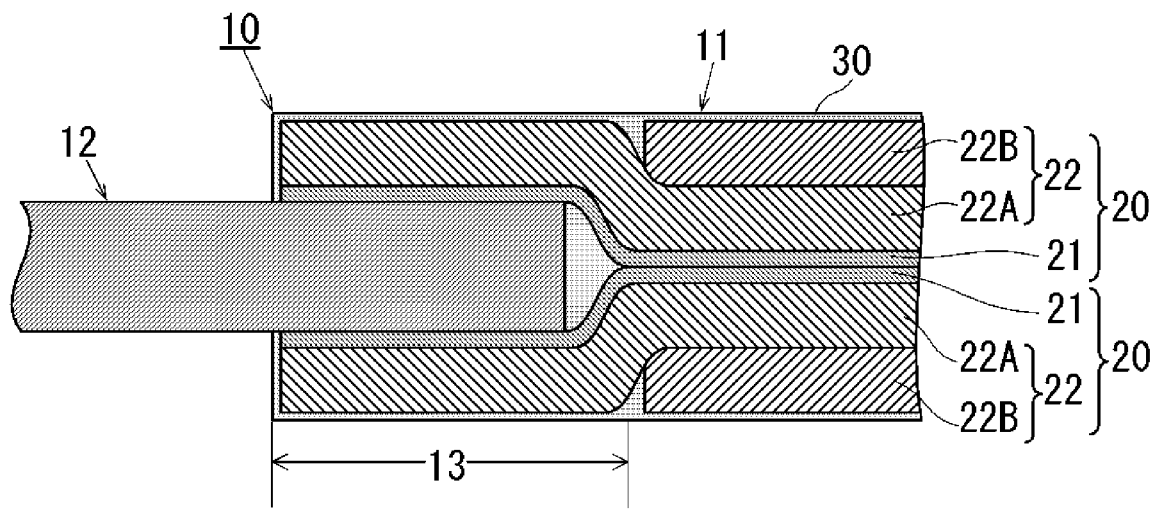
FIG. 2 is a cross-sectional view for explaining an example of the composite member of the present invention.

In FIGS. 1 and 2, a fiber layer is illustrated in a simplified manner by omitting fiber bundles. As illustrated in FIGS. 3 to 6, the inside of the actual fiber layer is filled with arranged fiber bundles. In addition, in FIGS. 1 to 8, sewing yarns for fixing the fiber layer (fiber bundles) to a base layer, even if present, are omitted because it is complicated.

[1] Composite Member

A composite member of the present invention includes: a fiber-reinforced member formed by impregnating a plurality of sheet-shaped core materials with a matrix resin; and a metal member joined to the fiber-reinforced member.

The composite member has a structure in which a part of the metal member is sandwiched and fixed between a plurality of the core materials stacked in a thickness direction at a joint place between the fiber-reinforced member and the metal member.

That is, as shown in FIGS. 1 and 2, a composite member 10 includes a fiber-reinforced member 11 and a metal member 12 joined to the fiber-reinforced member 11.

The fiber-reinforced member 11 is formed by impregnating a plurality of (two in the drawing) sheet-shaped core materials 20 with a matrix resin 30.

The composite member 10 has a structure in which a part of the metal member 12 is sandwiched and fixed between a plurality of (two in each drawing) the core materials 20 stacked in a thickness direction at a joint place 13 between the fiber-reinforced member 11 and the metal member 12.

Hereinafter, each member and the like constituting the composite member 10 will be described in detail.

<1> Fiber-Reinforced Member

The fiber-reinforced member 11 is formed by impregnating the plurality of sheet-shaped core materials 20 with the matrix resin 30 (see FIGS. 1 and 2).

Usually, the core materials 20 are fixed (cured or solidified) in a state where the matrix resin 30 is impregnated into the core materials 20, so that the fiber-reinforced member 11 has high strength, as a whole.

That is, mechanical strength of the fiber-reinforced member 11 as a whole is enhanced by adding the core materials 20 into the resin, as compared with a resin member made only of the matrix resin 30.

A shape, a planar size, and dimensions such as a thickness of the fiber-reinforced member 11 are not particularly limited, and are appropriately set according to the intended use of the composite member 10.

(1) Core Material

The core materials 20 are provided for the purpose of improving the strength of the fiber-reinforced member 11 by being impregnated with the matrix resin 30, in other words, by being embedded in the matrix resin 30.

The core materials 20 are each formed in a sheet shape. The sheet shape is a shape that spreads thinly and has flexibility, flexibility, and the like, and in other words, also referred to as a fabric-like shape. The shape of the core material 20 is not particularly limited as long as it is a sheet shape, and its planar shape, planar size and dimensions such as a thickness are not particularly limited.

In addition, the core material 20 can be formed into a three-dimensional solid having a cylindrical shape, a polygonal cylindrical shape, or a complicated solid shape having a curved surface, by laminating a plurality of core materials to form a plate shape, rounding, curving, or bending.

Figure 3:
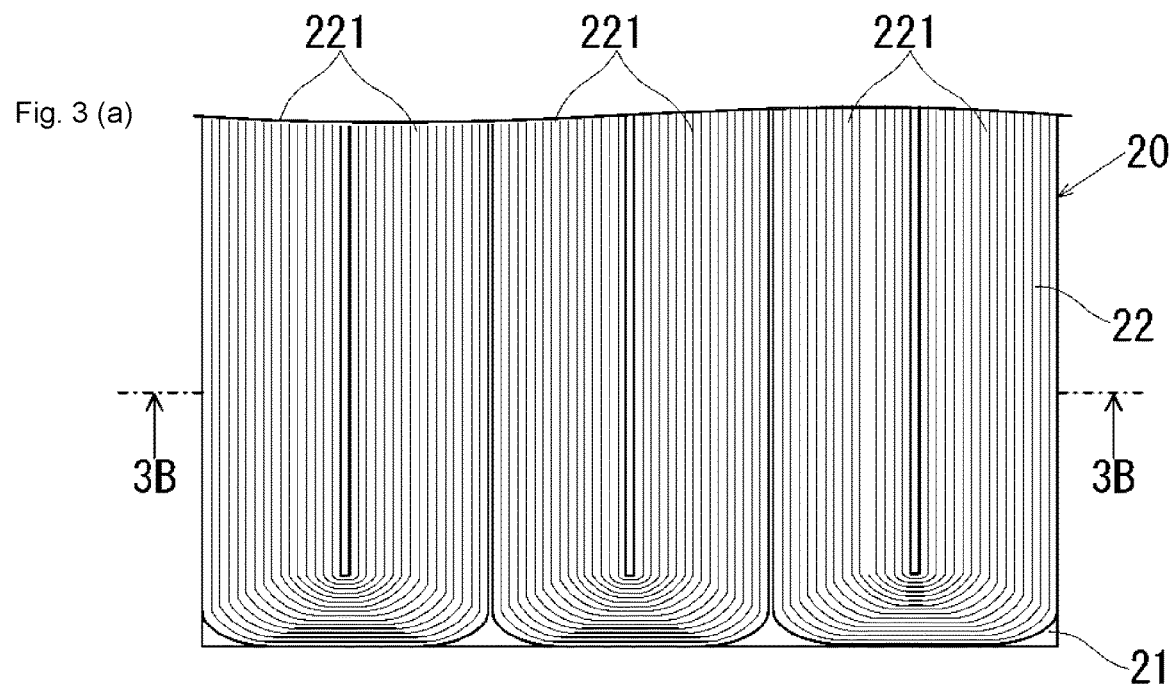
FIG. 3(a) is a plan view and FIG. 3(b) is a cross-sectional view taken along line 3B-3B in FIG. 3(a), for explaining an example of a core material.
Figure 3:
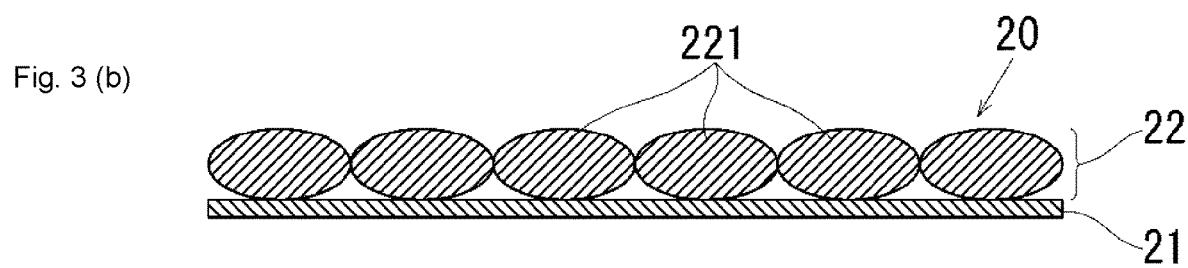
Figure 4:
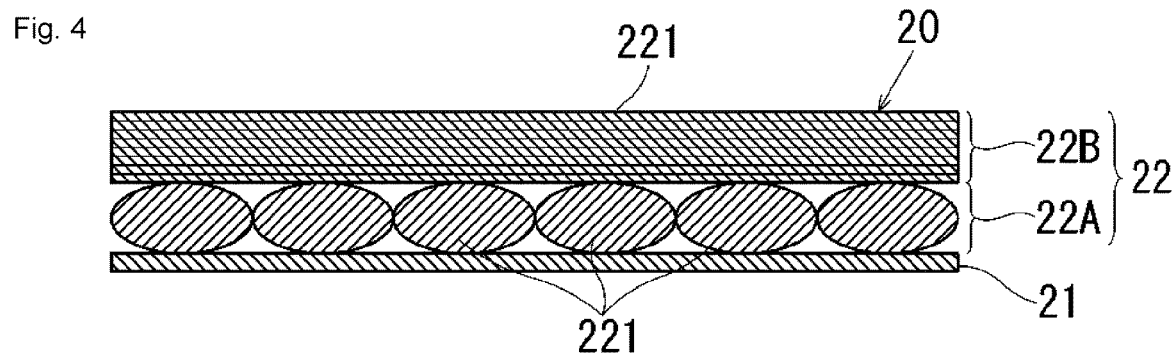
FIG. 4 is a cross-sectional view for explaining an example of a core material having a plurality of fiber layers.

The core material 20 may include a base layer 21 and a fiber layer 22 formed by arranging fiber bundles 221 on one surface side of the base layer 21 (see FIGS. 3 and 4).

(1-1) Base Layer

The base layer 21 is a layer provided for the purpose of fixing the fiber bundles 221 in order to form the fiber layer 22 (See FIGS. 3 and 4).

A material and the like for the base layer 21 are not particularly limited as long as the fiber bundles 221 can be fixed. Specifically, as the material for the base layer 21, a fiber assembly (textiles, knitted fabrics, nonwoven fabrics, and the like), a metal sheet (a foil, a plate, and the like), a resin sheet (a film, a plate, and the like), and the like can be used. These may be used singly, or two or more thereof may be used in combination.

A method for fixing the fiber layer 22 by the base layer 21 is not particularly limited. Examples of the fixing method include sewing, adhesion, and fusion. Among these fixing methods, sewing is preferable.

An advantage of sewing is, for example, that the fiber layer 22 can be fixed to the base layer 21 without causing any crimp in the fiber bundles 221. Another advantage of sewing is, for example, that a degree of binding of the fiber bundles 221 can be freely controlled by a tension of sewing yarns (not illustrated).

For example, when the fiber bundle 221 of the fiber layer 22 is sewn to the base layer 21, the mobility of the fiber bundles 221 (mobility with respect to the base layer 21 and/or mobility between the fiber bundles 221) can be secured while firmly fixing the fiber layer 22 to the base layer 21. Securing the mobility of the fiber bundles 221 imparts flexibility to the core material 20.

When the fiber layer 22 is sewn to the base layer 21, a fiber assembly is preferably used as a material for the base layer 21. That is, when the fiber assembly is used for the base layer 21, the fiber layer 22 is easily sewn, and flexibility can be imparted to the core material 20.

The fiber assembly may be any of a woven fabric, a knitted fabric, and a nonwoven fabric. Among these, a woven fabric is preferable. Advantages of the woven fabric include easiness to obtain a balance between flexibility and rigidity, and a high binding force of the sewing yarns used for sewing.

A texture of the woven fabric is not particularly limited, but a plain texture of 1×1, 2×2, 3×3 or the like is preferable. The plain texture is preferably finer than 5×5, more preferably finer than 4×4, still more preferably finer than 3×3, and particularly preferably finer than 2×2.

Constituent yarns of the fiber assembly are not particularly limited. As the constituent yarns, the same fibers as the reinforcing fibers constituting the fiber bundles 221 can be used, and different fibers can be used.

Specifically, various resin fibers, plant fibers, and the like can be used as the constituent yarns. Specific examples of a resin constituting the resin fiber include polyamides (aliphatic polyamide, aromatic polyamide, and the like) and polyesters (polyester having a constituent unit derived from an aromatic dicarboxylic acid, and the like). Specific examples of the plant fibers include cotton fibers and hemp fibers.

Fineness of the constituent yarns is not particularly limited. This fineness is preferably smaller than that of the fiber bundles 221.

(1-2) Fiber Bundle

The fiber bundles 221 are for forming the fiber layer 22, and is formed of a fiber assembly formed by aligning a plurality of reinforcing fibers (see FIGS. 3(a) and 3(b)). That is, the fiber bundles 221 are each formed of a bundle of a plurality of reinforcing fibers.

The fiber bundle 221 may be or need not be twisted. The fiber bundle 221 may include other fibers (non-reinforcing fibers) other than the reinforcing fibers. However, in the case where other fibers are contained, a content rate of the other fibers is preferably 10 mass % or less when the total amount of fibers constituting the fiber layer 22 is 100 mass %.

The fiber bundle 221 may be bundled in any manner. This bundling can be realized, for example, as a state where a plurality of reinforcing fibers are simply aligned. Alternatively, formation of bundles can be realized by bundling a plurality of reinforcing fibers using a yarn (yarn for formation of bundles). In addition, the formation of bundles can be realized by binding reinforcing fibers to each other using other agents such as an adhesive, a pressure-sensitive adhesive, and a heat fusing agent.

A type and the like of the reinforcing fibers are not particularly limited as long as the reinforcing fibers can reinforce the fiber-reinforced member 11. Usually, as the reinforcing fibers, inorganic material fibers or organic material fibers can be used, and inorganic material fibers and organic material fibers can also be used in combination.

Examples of the inorganic material fibers include carbon fibers (PAN-based carbon fibers, pitch-based carbon fibers), glass fibers, and metal fibers. These may be used singly, or two or more thereof may be used in combination.

Examples of the organic material fibers include aromatic polyamides (aramid fibers, trade name "Kevlar", etc.) and polybenzazole resin fibers (poly-paraphenylene benzobisoxazole fibers, trade name "ZYLON", etc.). These may be used singly, or two or more thereof may be used in combination.

Among the above-mentioned reinforcing fibers, carbon fibers which are inorganic material fibers are preferable, and advantages thereof are, for example, that the reinforcing fibers are easily available, lightweight, and high in strength.

A fiber form of the reinforcing fibers is not particularly limited. Examples of the fiber form include a spun yarn and a filament yarn, and a combined form thereof can also be used.

When the fiber form of the reinforcing fibers is a filament yarn, the reinforcing fibers may be used as a monofilament, a multifilament, or a combination thereof.

As the reinforcing fibers, surface-treated reinforcing fibers can be used for the purpose of improving the affinity with the matrix resin 30.

The number of reinforcing fibers constituting one fiber bundle 221 is not particularly limited. This number can be, for example, 3000 or more.

When the number of reinforcing fibers constituting one fiber bundle 221 is 3000 or more, the fiber bundles can exhibit excellent strength as the core material while being flexible.

The number of reinforcing fibers can be, for example, 3000 or more and 100,000 or less, further 5000 or more and 70,000 or less, further 7000 or more and 50,000 or less, and further 10,000 or more and 30,000 or less.

As the fiber bundle 221, a fiber bundle (thick bundle) in which the number of reinforcing fibers constituting one fiber is increased can also be used.

When a thick bundle is used, the number of reinforcing fibers can be, for example, 30,000 or more, further 40,000 or more, and further 60,000 or more.

On the other hand, when a thick bundle is used, the number of reinforcing fibers can be, for example, 1.5 million or less, or 1 million or less.

(1-3) Fiber Layer

The fiber layer 22 is formed by arranging the fiber bundles 221 in parallel on one surface side of the base layer 21 (See FIGS. 3(a) and 3(b)).

A form of the fiber layer 22 is not particularly limited. This form can be, for example, a structure in which the fiber bundles 221 are arranged on the entire one surface of the base layer 21, and can be a structure in which the fiber bundles 221 are arranged only at necessary sites on the one surface of the base layer 21.

The fiber layer 22 may be composed only of one fiber bundle 221 or may be composed of a plurality of fiber bundles 221.

When the fiber layer 22 is composed only of one fiber bundle 221, it can be realized by folding and disposing one fiber bundle 221 so that the fiber bundle occupies one surface of the base layer 21. In this case, a folded form of the fiber bundle 221 is not particularly limited. Examples of the folded form include a bellows shape and a spiral shape (circular spiral, polygonal spiral, etc.) in plan view.

When the fiber layer 22 is composed of a plurality of fiber bundles 221, it can be realized by aligning and disposing the plurality of fiber bundles 221 so that the fiber bundles occupy one surface of the base layer 21.

One fiber layer 22 can also be formed so as to occupy one surface of the base layer 21 by folding and disposing one fiber bundle 221 and aligning and disposing a plurality of other fiber bundles 221.

As described above, the fiber bundles 221 are arranged so as to occupy one surface of the base layer 21, and are accumulated to form the fiber layer 22.

Since the fiber layer 22 is not formed by weaving or knitting the fiber bundles 221, the fiber bundles 221 can be disposed in a planar manner without providing any crimp.

That is, in the fiber layer 22 in the core material 20, orientation of the fiber bundles 221 in the thickness direction is suppressed, and flatness of the fiber bundles 221 can be increased. As a result, propagation of force through the orientation of the fiber bundle 221 in the thickness direction is suppressed, and an excellent impact absorption force can be exhibited. In particular, it is possible to obtain the fiber-reinforced member 11 having an excellent action of inhibiting a phenomenon in which the fiber-reinforced member is continuously destructed from one surface side to the other surface side by an impact force applied from the one surface side to the other surface side in the thickness direction.

The core material 20 may have only one fiber layer 22, but may also have a plurality of fiber layers 22 by laminating two or more layers.

The configuration exemplified in FIGS. 3(a) and 3(b) is a configuration in the case where the core material 20 has only one fiber layer 22.

That is, as shown in FIGS. 3(a) and 3(b), the core material 20 has one fiber layer 22 formed by arranging the fiber bundles 221 in parallel on one surface side of the base layer 21.

As a specific example when the core material 20 has a plurality of the fiber layers 22, the configuration illustrated in FIG. 4 is a configuration when the core material 20 has two fiber layers.

That is, as shown in FIG. 4, the core material 20 includes a first fiber layer 22A formed by arranging the fiber bundles 221 in parallel on one surface side of base layer 21, and a second fiber layer 22B formed by arranging the other fiber bundles 221 in layers on one surface side of the first fiber layer 22A.

The two layers, i.e., the first fiber layer 22A and the second fiber layer 22B, can be configured to be fixed together with respect to one base layer 21, but can also be configured such that the first fiber layer 22A is fixed to the base layer 21 and the second fiber layer 22B is fixed to the first fiber layer 22A.

When the fiber layer 22 includes two layers, i.e., the first fiber layer 22A and the second fiber layer 22B, an arrangement direction of the fiber bundles 221 of the first fiber layer 22A and an arrangement direction of the fiber bundles 221 of the second fiber layer 22B may be parallel to each other, but are preferably different from each other.

Specifically, it is preferable to dispose the fiber bundles 221 of the first fiber layer 22A and the fiber bundles 221 of the second fiber layer 22B so as to intersect each other. An intersection angle θ at this time is preferably more than 0 degrees and 90 degrees or less (0 degrees<θ≤90 degrees).

In the configuration illustrated in FIG. 4, the fiber bundles 221 of the first fiber layer 22A and the fiber bundles 221 of the second fiber layer 22B intersect each other with the intersection angle θ being 90 degrees.

In the following description, when the fiber layer 22 includes two layers, i.e., the first fiber layer 22A and the second fiber layer 22B, the fiber layer disposed on the base layer 21 side, that is, on the inner side is referred to as the first fiber layer 22A, and the fiber layer disposed on the outer side is referred to as the second fiber layer 22B, regardless of the arrangement directions of the fiber bundles 221.

(2) Stacking of Core Materials

The fiber-reinforced member 11 includes a plurality of the core materials 20. As exemplified in FIGS. 5 and 6, this configuration can be realized by stacking the plurality of core materials 20 in the thickness direction of the core materials 20.

Figure 5:
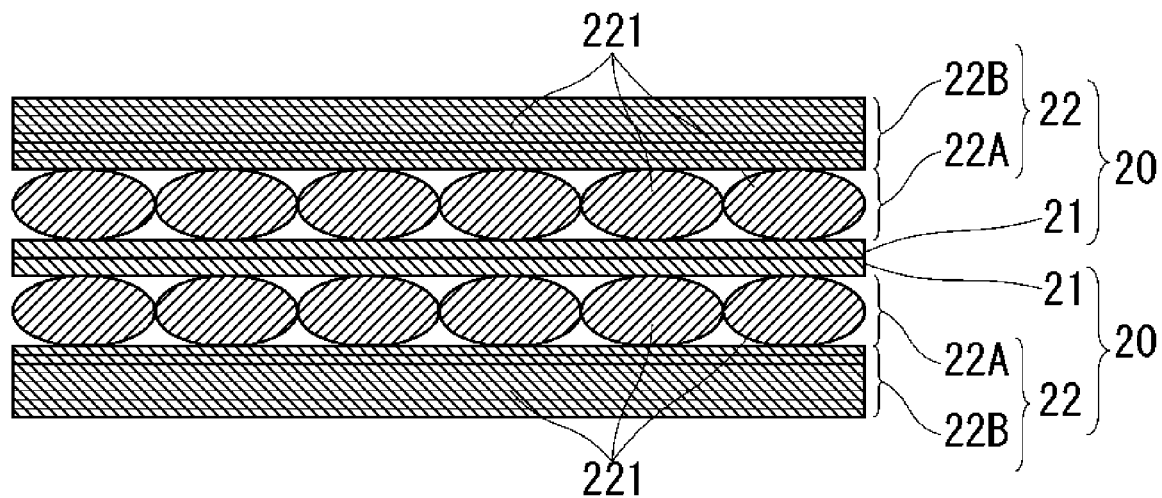
FIG. 5 is a cross-sectional view for explaining an example of stacking a plurality of core materials.
Figure 6:
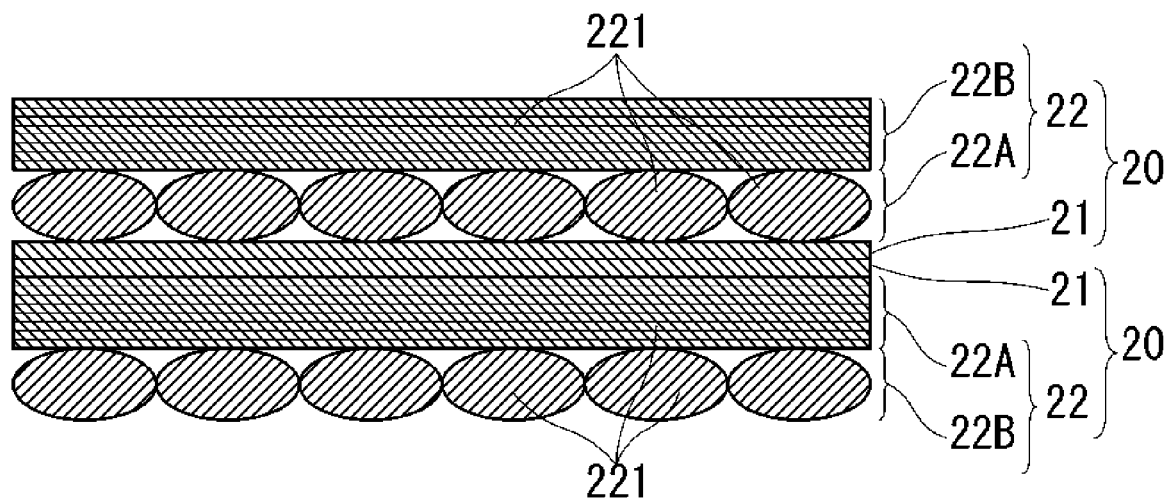
FIG. 6 is a cross-sectional view for explaining an example of stacking a plurality of core materials.

That is, as the core materials 20 shown in FIGS. 5 and 6, a total of two core materials 20 having the configuration exemplified in FIG. 4 are used, and the respective core materials 20 are disposed such that the fiber layer 22 faces outward and the base layer 21 faces inward, and then stacked in the thickness direction.

In the core material 20 on the upper side in FIG. 5 and the core material 20 on the lower side in FIG. 5 as the core materials 20 illustrated in FIG. 5, the arrangement directions of the fiber bundles 221 of their first fiber layers 22A are defined as being identical, and the arrangement directions of the fiber bundles 221 of their second fiber layers 22B are defined as being identical.

On the other hand, in the core material 20 on the upper side in FIG. 6 and the core material 20 on the lower side in FIG. 6 as the core materials 20 illustrated in FIG. 6, the arrangement direction of the fiber bundles 221 of the first fiber layer 22A in either one of the core materials 20 and the arrangement direction of the fiber bundles 221 of the second fiber layer 22B in the other core material 20 are defined as being identical.

In the fiber-reinforced member 11, the two core materials 20 disposed such that the fiber layer 22 faces outward and the base layer 21 faces inward are stacked such that their base layers 21 face each other (see FIGS. 5 and 6).

As an advantage of the configuration in which the plurality of core materials 20 are stacked with their base layers 21 facing each other, it is possible to more highly control the propagation of force in the thickness direction of the core materials 20.

That is, the fiber layer 22 (the first fiber layer 22A and the second fiber layer 22B) does not have any crimp, and therefore the propagation of force in the thickness direction can be highly suppressed.

On the other hand, in and between the layers in which the base layers 21 are disposed to face each other, the two base layers 21 are disposed side by side, and thus there is an action of increasing the propagation of force in the layer direction in and between the base layers 21.

That is, by making it easy to form cracks in the layer direction, the impact force applied toward the thickness direction can be efficiently dispersed in the layer direction, and the magnitude of the impact force in the thickness direction can be weakened.

Although the core material 20 (see FIG. 4) having a plurality of the fiber layers 22 is used in the configurations illustrated in FIGS. 5 and 6, the present invention is not limited to this configuration, and the core material 20 (see FIG. 3(b)) having only one fiber layer 22 can also be used. In this case, in the two core materials 20 stacked in the thickness direction, the arrangement directions of the fiber bundles 221 of their fiber layers 22 can be defined as being identical, or can be defined as being different.

In addition, the configuration of the core materials 20 is not limited to a configuration in which two core materials are stacked, and three or more core materials may be stacked.

The configuration of the core materials 20 is not limited to a configuration in which their base layers 21 are stacked to face each other, but their fiber layers 22 may be stacked to face each other.

(3) Matrix Resin

The matrix resin 30 is a resin with which the core material 20 is impregnated, in other words, a resin in which the core material 20 is embedded (See FIGS. 1 and 2).

More specifically, the matrix resin 30 is a resin serving as a base material of the fiber-reinforced member 11. That is, the matrix resin 30 is a resin that is impregnated so as to extend into the core material 20, and fixed (cured in the case of a curable resin, and solidified in the case of a thermoplastic resin).

The matrix resin 30 may be present so as to cover a surface of the core material 20.

As methods for impregnating and fixing the matrix resin 30, various conventionally known methods can be used.

A type of the matrix resin 30 is not limited, and various resins can be used. That is, a thermosetting resin may be used, a thermoplastic resin may be used, or these resins may be used in combination.

Examples of the thermosetting resin include epoxy resins, polyester resins (curable polyester resins), and urethane resins.

Examples of the thermoplastic resin include polyolefin resins, acrylic resins, polyester resins (thermoplastic polyester resins), and polyamide resins.

FIGS. 1 and 2 illustrate the composite member 10 using the core material 20 illustrated in FIG. 5 or 6 as the core material 20 of the fiber-reinforced member 11. That is, the fiber-reinforced member 11 as illustrated in FIGS. 1 and 2 is formed by enclosing, in the matrix resin 30, the two core materials 20 each having the base layer 21 and the plurality of fiber layers 22.

<2> Metal Member

The metal member 12 is joined to the fiber-reinforced member 11 to constitute the composite member 10.

A part of the metal member 12 is inserted into the fiber-reinforced member 11 at the joint place 13 of the composite member 10 (see FIGS. 1 and 2).

The part of the metal member 12 inserted into the fiber-reinforced member 11 is adhered to and integrated with the fiber-reinforced member 11 by the matrix resin 30 impregnated in the core material 20 of the fiber-reinforced member 11 functioning as a so-called adhesive.

A shape, a size, and dimensions such as a thickness of the metal member 12 are not particularly limited, and are appropriately set according to the intended use of the composite member 10.

Usually, the composite member 10 is used for a component for automobile or a building material, and examples of the metal member 12 adapted for such an intended use include a metal fitting for connecting, fastening, welding, or the like the composite member 10 of the present invention to any other member.

Examples of such a metal fitting include a hinge metal fitting rotatable with respect to other members, a connecting metal fitting such as a bracket metal fitting or a joint metal fitting fixed with respect to other members, a stay metal fitting supported with respect to other members, an angle metal fitting, for example, fixed at a predetermined angle with respect to other members, and a fastening metal fitting fastened with respect to other members.

As for a shape of the metal member 12, it is preferable that a part of the metal member inserted into the fiber-reinforced member 11 at the joint place 13, that is, a part of the metal member sandwiched and fixed between the plurality of core materials 20 should have a flat plate shape. In this case, it is possible to suppress an increase in thickness of the fiber-reinforced member 11 at the joint place 13.

As for the shape of the metal member 12, the part of the metal member sandwiched and fixed between the core materials 20 preferably has a flat plate shape, but other sites can have any shape such as a flat plate shape, a long plate shape, a cross-sectional L shape, a planar T shape, a hook shape, or a rod shape depending on the above-described intended use and the like, without particular limitation.

A metal material to be used for the metal member 12 is not particularly limited, and is appropriately selected according to the intended use and the like. Specific examples of the metal material include iron, steel, aluminum, an aluminum alloy, copper, and stainless steel. Usually, steel, an aluminum alloy, or the like is selected as the metal material.

As the metal member 12, a surface-treated metal member can be used for the purpose of improving the affinity with the matrix resin 30. Examples of the surface treatment include a corona treatment, a blast treatment, and a primer treatment. In addition, advantages in the case of using the metal member 12 subjected to the surface treatment include an improvement in adhesive force due to the anchor effect and an improvement in strength and rigidity of the joint place 13, due to an increase in affinity between the metal member 12 and the matrix resin 30.

The surface treatment can be applied to the entire metal member 12, but can also be applied to only a part inserted into the fiber-reinforced member 11.

Figure 7:
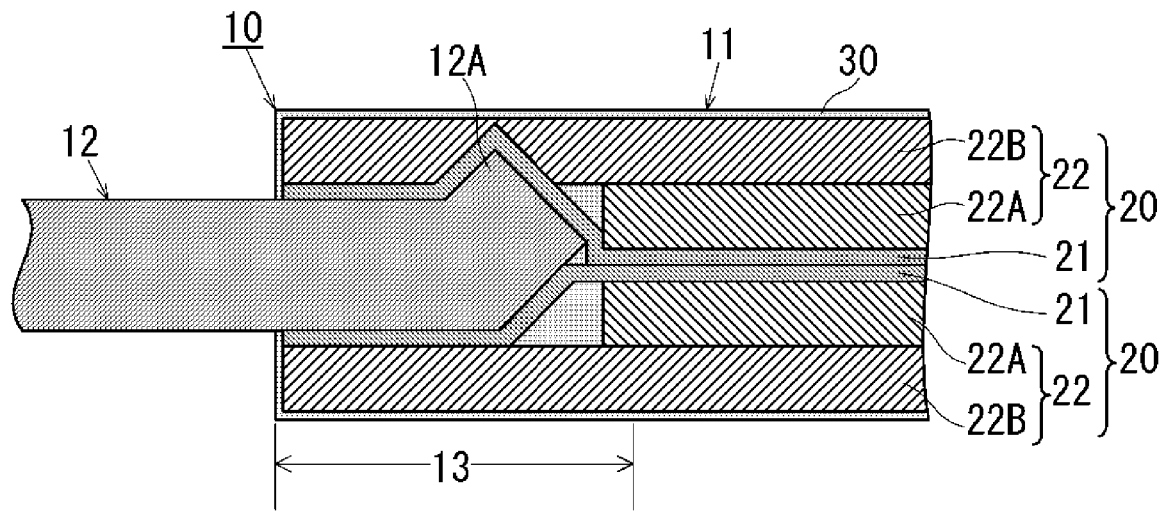
FIG. 7 is a cross-sectional view for explaining another example of the composite member of the present invention.
Figure 8:
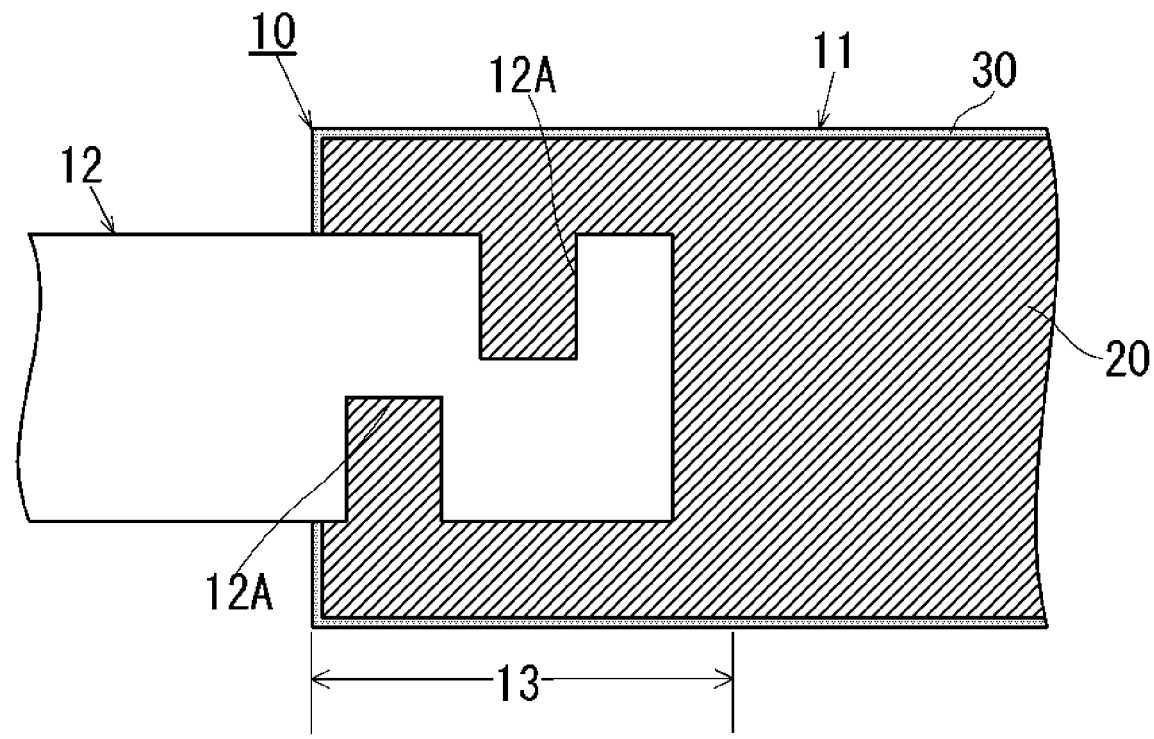
FIG. 8 is a cross-sectional view for explaining another example of the composite member of the present invention.

The metal member 12 can have an anchor portion 12A locked to the core material 20 at the joint place 13 of the composite member 10 (see FIGS. 7 and 8).

Advantages in the case where the anchor portion 12A is formed in the metal member 12 include an improvement in strength of the joint place 13 due to the fact that the anchor portion 12A is locked to the core material 20, so that the metal member 12 is constrained from coming off from the inside of the fiber-reinforced member 11.

The anchor portion 12A illustrated in FIG. 7 is formed by bending an end of the metal member 12.

That is, as illustrated in FIG. 7, one anchor portion 12A is formed by bending a tip end of the metal member 12 upward in a plate thickness direction of the metal member 12.

The anchor portion 12A is locked to the core material 20 so as to bite into the core material 20 disposed on the upper side in FIG. 7.

The anchor portion 12A illustrated in FIG. 8 is formed by cutting out a peripheral edge of the metal member 12. That is, as illustrated in FIG. 8, a plurality of (two in the drawing) anchor portions 12A are formed by cutting out two places of the peripheral edge of the metal member 12 in a concave shape. The anchor portions 12A are locked to the core material 20 so that the core material 20 is press-fitted into the anchor portions 12A.

When the peripheral edge of the metal member 12 is cut out to form the anchor portion 12A, the core material 20 is provided with convex portions adapted for the shape of the anchor portions 12A, for example, by cutting a part of the core material 20, so that the core material 20 and the metal member 12 can be configured to have complementary shapes in plan view. As an advantage of this configuration, it is possible to suitably constrain the metal member 12 from coming off from the inside of the fiber-reinforced member 11.

A shape of the anchor portion 12A is not particularly limited, and may be a claw shape, a grater shape including a plurality of concave portions and convex portions, or the like in addition to the shapes illustrated in FIGS. 7 and 8.

The number of the anchor portions 12A is not particularly limited, and may be only one as illustrated in FIG. 7, may be two as illustrated in FIG. 8, or may be three or more.

<3> Joint Place

The composite member 10 has a structure in which a part of the metal member 12 is sandwiched and fixed between the plurality of core materials 20 at the joint place 13 between the fiber-reinforced member 11 and the metal member 12 (see FIGS. 1 and 2).

That is, at the joint place 13, the fiber-reinforced member 11 and the metal member 12 are joined in a state of being arranged substantially linearly in a joining direction, that is, in series, by sandwiching and fixing a part of the metal member 12 between the two core materials 20.

At the joint place 13 between the fiber-reinforced member 11 and the metal member 12 joined in series, central axes of the fiber-reinforced member 11 and the metal member 12 are substantially coaxial.

In the composite member 10 of the present invention, when a load is applied to the joint place 13, the central axes of the fiber-reinforced member 11 and the metal member 12 are misaligned with each other, so that a peeling mode in which stress acts so as to peel them from each other hardly occurs, and that strength can be improved.

In the composite member 10, it is not necessary to provide, in the fiber-reinforced member 11, a hole or the like for fastening it to the metal member 12 at the joint place 13. That is, at the joint place 13, the fiber-reinforced member 11 does not have formed therein any place where the reinforcing fibers for improving the strength are broken or cut in the middle or any place where no reinforcing fiber (fiber layer 22) is present, and does not have formed therein any portion with reduced strength for joining with the metal member 12.

At the joint place 13, the metal member 12 is adhered to the fiber-reinforced member 11 by the matrix resin 30 functioning as an adhesive.

Regarding this adhesion, since the metal member 12 is sandwiched and fixed between the two core materials 20 constituting the fiber-reinforced member 11, the surfaces in contact with the respective core materials 20, that is, both the front surface and the back surface, serve as adhesion surfaces.

As compared with the case where the adhesion surface of the metal member to be joined to the fiber-reinforced member in a normal offset state is either one of the front surface and the back surface, in the metal member 12 of the composite member 10 of the present invention, both the front surface and the back surface serve as adhesion surfaces, so that the adhesion surface can be enlarged, and that the strength can be improved.

As described above, in the fiber-reinforced member 11, the two core materials 20 are stacked such that their base layers 21 face each other (see FIGS. 5 and 6).

At the joint place 13, the metal member 12 is sandwiched and fixed between the two core materials 20, specifically, between the base layers 21 of the respective core materials 20 (see FIGS. 1 and 2).

That is, the core material 20 at the joint place 13 is disposed such that the base layer 21 is in contact with the metal member 12.

As an advantage that the core material 20 is disposed such that the base layer 21 is in contact with the metal member 12, it is possible to prevent electrolytic corrosion by avoiding contact between the fiber layer 22 and the metal member 12.

That is, in the case where carbon fibers are used as the reinforcing fibers constituting the fiber layer 22, when steel, aluminum, or an aluminum alloy is used as the metal material for the metal member 12, the metal member 12 may corrode due to occurrence of electrolytic corrosion by contact between the fiber layer 22 and the metal member 12.

Therefore, it is preferable that the metal member 12 should avoid contact with the fiber layer 22, and occurrence of electrolytic corrosion can be prevented by disposing the core material 20 so as to bring the base layer 21 into contact with the metal member 12.

When the core material 20 has a plurality of fiber layers 22, the core material 20 at the joint place 13 can be configured such that the number of fiber layers 22 is reduced as compared with the core material 20 constituting the fiber-reinforced member 11.

When the joint place 13 between the fiber-reinforced member 11 and the metal member 12 has a structure in which a part of the metal member 12 is sandwiched and fixed between the plurality of core materials 20, the thickness of the composite member at the joint place usually increases by the thickness of the sandwiched and fixed metal member.

On the other hand, when the number of fiber layers 22 is reduced for the core material 20 at the joint place 13, the thickness of the composite member 10 is constrained from increasing by the thickness of the metal member 12 at the joint place 13, and the thickness of the entire composite member 10 can be made substantially uniform.

Specifically, as exemplified in FIGS. 1 and 2, the configuration in which the number of fiber layers 22 of the core material 20 is reduced at the joint place 13 can be realized by using only the second fiber layer 22B or only the first fiber layer 22A as the fiber layer 22 of the core material 20 present at the joint place 13.

That is, at the joint place 13 of the composite member 10 exemplified in FIG. 1, the core material 20 constituting the fiber-reinforced member 11 is formed such that a length of the first fiber layer 22A is shorter than a length of the second fiber layer 22B in the joining direction with the metal member 12.

Therefore, the fiber layers 22 of the core material 20 constituting the fiber-reinforced member 11 are two layers, i.e., the first fiber layer 22A and the second fiber layer 22B. On the other hand, the fiber layer 22 of the core material 20 present at the joint place 13 is only one layer in total, i.e., only the second fiber layer 22B, and the number of layers is reduced.

That is, at the joint place 13 of the composite member 10 exemplified in FIG. 2, the core material 20 constituting the fiber-reinforced member 11 is formed such that the length of the second fiber layer 22B is shorter than the length of the first fiber layer 22A in the joining direction with the metal member 12.

Therefore, the number of fiber layers 22 of the core material 20 present at the joint place 13 is only one in total, i.e., only the first fiber layer 22A, and the number of layers is reduced.

Further, in the configuration exemplified in FIG. 2, the metal member 12 is sandwiched and fixed between the two core materials 20 at the joint place 13, whereby the first fiber layer 22A of the core material 20 and the base layer 21 are bent outward so as to avoid the metal member 12.

As described above, a specific method of making the lengths of the first fiber layer 22A and the second fiber layer 22B in the joining direction with the metal member 12 different from each other includes a method of increasing or decreasing the number of the fiber bundles 221 forming each fiber layer or changing the arrangement position of the fiber bundles 221 on the base layer 21.

[2] Seat for Automobile

A seat for automobile according to the present invention includes a site formed of the above-described composite member.

Figure 9:
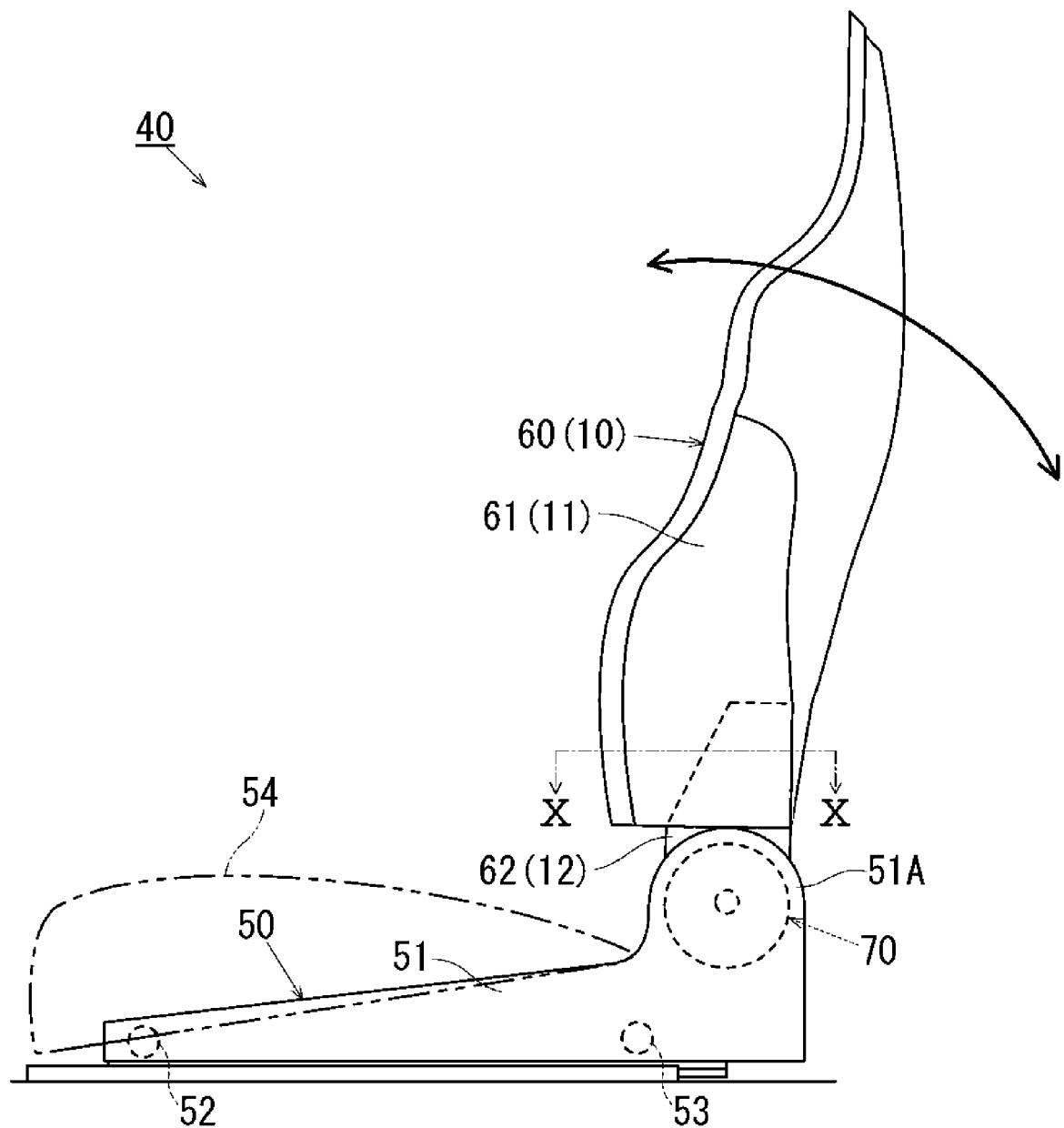
FIG. 9 is a side view for explaining a seat for automobile of the present invention.

The seat for automobile includes a seat frame 40 including a seat cushion frame 50, a seat back frame 60, and a recliner 70 (see FIG. 9). The composite member 10 described above can be applied to the seat back frame 60 of the seat frame 40.

The seat back frame 60 includes a seat back shell 61 and a pair of left and right upper arms 62. The fiber-reinforced member 11 constituting the composite member 10 can be applied to the seat back shell 61. The metal member 12 constituting the composite member 10 can be applied to the upper arms 62.

Figure 10:
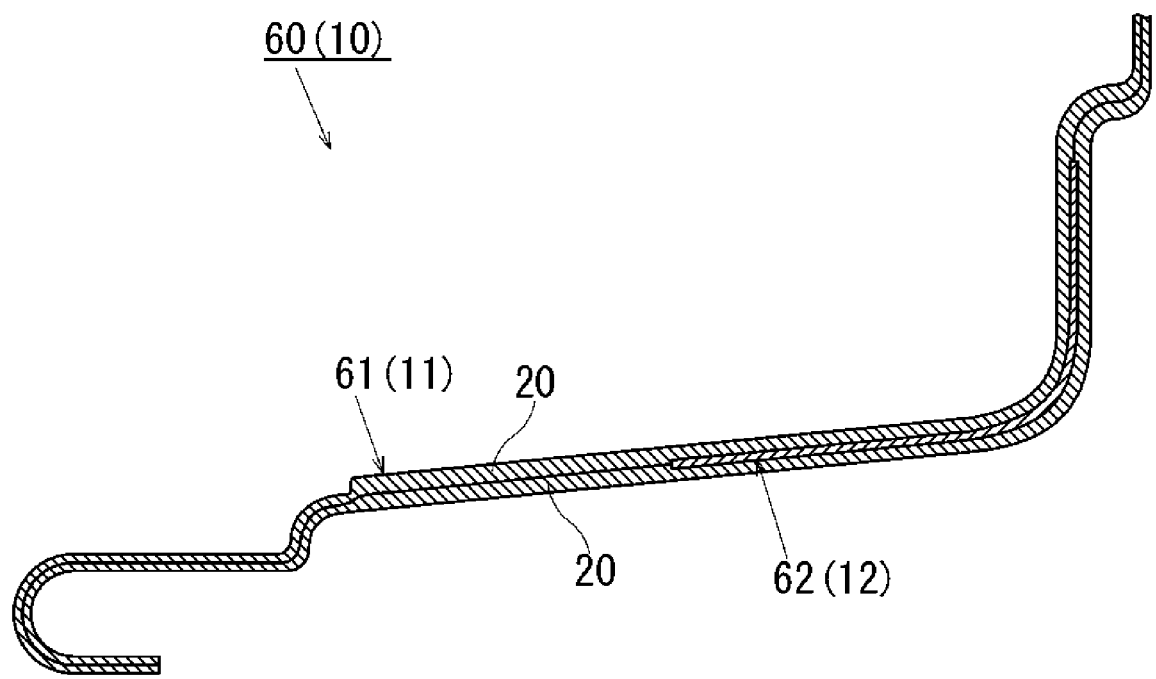
FIG. 10 is a cross-sectional plan view taken along line X-X indicated in FIG. 9.

That is, the seat for automobile according to the present invention includes
a seat back frame formed of a composite member, including a seat back shell formed of a fiber-reinforced member formed by impregnating a plurality of sheet-shaped core materials with a matrix resin, and upper arms formed of a metal member to be joined to the seat back shell (see FIG. 9),
in which the seat back frame can have a structure in which a part of the upper arms is sandwiched and fixed between a plurality of the core materials stacked in a thickness direction at a joint place between the seat back shell and the upper arms (see FIG. 10).

Hereinafter, the seat frame of the seat for automobile will be described in detail.

The seat frame constitutes a framework of the seat for automobile, and an exterior material such as a cushion or a cover (not illustrated) is attached to a surface of the seat frame to constitute the seat for automobile.

As illustrated in FIG. 9, the seat frame 40 includes the seat cushion frame 50, the seat back frame 60, and the recliner 70.

The seat cushion frame 50 constitutes a framework of a seat surface portion of the seat for automobile. The seat cushion frame 50 includes a pair of left and right side frames 51, a front pipe 52 connecting front ends of the side frames 51, and a rear pipe 53 connecting rear ends of the side frames 51.

The side frames 51 each are provided with a lower arm portion 51A used for connecting the seat cushion frame 50 and the seat back frame 60. The lower arm portion 51A is formed such that an upper edge portion of the rear end of each of the side frames 51 protrudes upward in a semicircular plate shape.

As indicated by a two-dot chain line in FIG. 9, a cushion pad 54 is attached to the seat cushion frame 50 so as to cover the seat frame 40.

The seat cushion frame 50, the cushion pad 54, and the like are covered with an exterior member (not illustrated) to form the seat surface portion of the seat for automobile.

The seat back frame 60 constitutes a framework of a backrest portion of the seat for automobile. The seat back frame 60 includes a seat back shell 61 and a pair of left and right upper arms 62.

The seat back shell 61 is formed in a three-dimensional shape having a concave surface as a whole, as a shape conforming to an outer shape of a rear side of an upper body of an occupant so as to enhance holding feeling when the occupant leans back on the seat.

The upper arms 62 are provided at both left and right ends of the seat for automobile in a width direction so as to protrude downward from a lower end of the seat back shell 61. The upper arms 62 are used for connecting the seat cushion frame 50 and the seat back frame 60, and are joined and fixed to the seat back shell 61.

In the seat back frame 60, for example, a back pad (not illustrated) is attached, for example, to a site in contact with the upper body of the occupant. The seat back frame 60, the back pad, and the like are covered with an exterior member (not illustrated) to form a backrest portion of the seat for automobile.

The recliner 70 rotatably connects the seat back frame 60 to the seat cushion frame 50.

That is, the upper arms 62 of the seat back frame 60 are located inside the lower arm portions 51A of the seat cushion frame 50 in the width direction of the seat for automobile and are disposed so as to face the lower arm portions 51A.

The recliner 70 is assembled between the upper arms 62 and the lower arm portions 51A, and connects the seat back frame 60 and the seat cushion frame 50.

By operating the recliner 70 using a lever (not illustrated) or the like, the seat back frame 60 is rotatable about the recliner 70 in a direction of an arrow illustrated in FIG. 9 so that the backrest angle can be adjusted to any angle.

In the seat frame 40, the seat back frame 60 is a site formed of the composite member 10 described above.

FIG. 10 is a cross-sectional plan view taken along line X-X indicated in FIG. 9. As shown in FIG. 10, the seat back shell 61 of the seat back frame 60 is a site formed of the fiber-reinforced member 11. That is, the seat back shell 61 is configured by impregnating a plurality of (two in FIG. 10) sheet-shaped core materials 20 with a matrix resin (not illustrated).

In the seat back frame 60, the upper arms 62 are sites formed of the above-described metal member 12 joined to the seat back shell 61 which is the fiber-reinforced member 11. That is, the upper arms 62 are metal members formed using the above-described metal material. The upper arms 62 each have a structure in which an upper portion (see FIG. 9), which is a part thereof, is sandwiched and fixed between the plurality of core materials 20 stacked in the thickness direction.

The seat back frame 60 has a structure in which the upper portion of the upper arm 62, which is the metal member 12, is sandwiched and fixed between the plurality of core materials 20 constituting the seat back shell 61, which is the fiber-reinforced member 11, and constitutes the composite member 10.

The seat for automobile according to the present invention includes the seat back frame 60 as a site formed of the composite member 10.

In the seat back frame 60 formed of the composite member 10, the seat back shell 61 formed of the fiber-reinforced member 11 and the upper arms 62 formed of the metal member 12 and joined to the seat back shell 61 are joined in a state where their central axes substantially coincide with each other.

In addition, the seat back shell 61 and the upper arms 62 are joined without using a fastening member such as a bolt or a nut, and a decrease in strength, for example, due to stress concentration on the fastening place or the like is prevented.

[3] Component for Automobile

A component for automobile according to the present invention includes a site formed of the above-described composite member.

Examples of such a component for automobile include exterior materials for automobiles, interior materials for automobiles, structural materials for automobiles, shock absorbers for automobiles, components in engine rooms, and the like.

Specific examples of the component for automobile includes bumper, spoiler, cowling, front grille, garnish, hood, cargo room lid, cowl louver, fender panel, rocker molding, door panel, roof panel, instrument panel, center cluster, door trim, quarter trim, roof lining, pillar garnish, deck trim, tonneau board, package tray, dashboard, console box, kicking plate, switch base, seat back board, seat frame, arm rest, sun visor, intake manifold, energy absorbers such as engine head cover, engine under cover, oil filter housing, housing for on-vehicle electronic component (ECU, TV monitor, etc.), air filter box and rush box, and body shell constituent parts such as front end module.

[4] Others

Examples of products including a site formed of the composite member of the present invention include interior materials, exterior materials, and structural materials for buildings and furniture, in addition to the above-described seat for automobile and component for automobile.

That is, the product can include a door covering material, a door structural material, a covering material of various types of furniture (desk, chair, shelf, chest of drawers, etc.), a structural material, and, further, a modular bath, a septic tank, and the like.

In addition, the product can include a packaging body, an accommodating body (tray, etc.), a protecting member, a partition member, and the like. Further, the product can include a molded body such as housings and structures for household electric appliances (slim-type TV, refrigerator, washing machine, vacuum cleaner, mobile phone, portable game machine, notebook personal computer, etc.).

What is claimed is:

1. A composite member comprising:
   a fiber-reinforced member formed by impregnating a plurality of sheet-shaped core materials with a matrix resin; and a metal member joined to the fiber-reinforced member,
   the composite member having a structure in which a part of the metal member is sandwiched and fixed between a plurality of the core materials stacked in a thickness direction at a joint place between the fiber-reinforced member and the metal member,
   wherein the core materials each include a base layer and a fiber layer formed by arranging fiber bundles on one surface side of the base layer,
   wherein the base layer consists of a fiber assembly, the fiber assembly being any of a woven fabric, a knitted fabric, and a nonwoven fabric,
   wherein each of the fiber bundles is formed by aligning a plurality of reinforcing fibers,
   wherein each of the fiber bundles is sewn to the base layer, and
   wherein the core material at the joint place is disposed such that the base layer is in contact with the metal member.

2. The composite member according to claim 1,
   wherein the core material constituting the fiber-reinforced member has a plurality of the fiber layers, and
   wherein the core material at the joint place has a smaller number of the fiber layers than a number of the fiber layers of the core material constituting the fiber-reinforced member.

3. The composite member according to any one of claim 1, wherein, at the joint place, the metal member has an anchor portion locked to the core material.

4. The composite member according to claim 3, wherein the anchor portion is formed by bending an end of the metal member.

5. The composite member according to claim 3, wherein the anchor portion is formed by cutting out a peripheral edge of the metal member.

6. A seat for automobile comprising a site formed of the composite member according to claim 1.

7. A component for automobile comprising a site formed of the composite member according to claim 1.

8. The composite member according to claim 1,
   wherein the core material has, as the fiber layer, a first fiber layer formed by arranging the fiber bundles on one surface side of the base layer, and a second fiber layer formed by arranging the fiber bundles on one surface side of the first fiber layer,
   wherein the fiber bundles of the first fiber layer and the fiber bundles of the second fiber layer are arranged to intersect each other.

* * * * *